March 19, 1957  W. H. DE BAUN  2,786,001
GARBAGE AND TABLEWARE SEPARATING EQUIPMENT
AND METHOD USING MOTIVATING WATER JETS
Filed Oct. 19, 1953
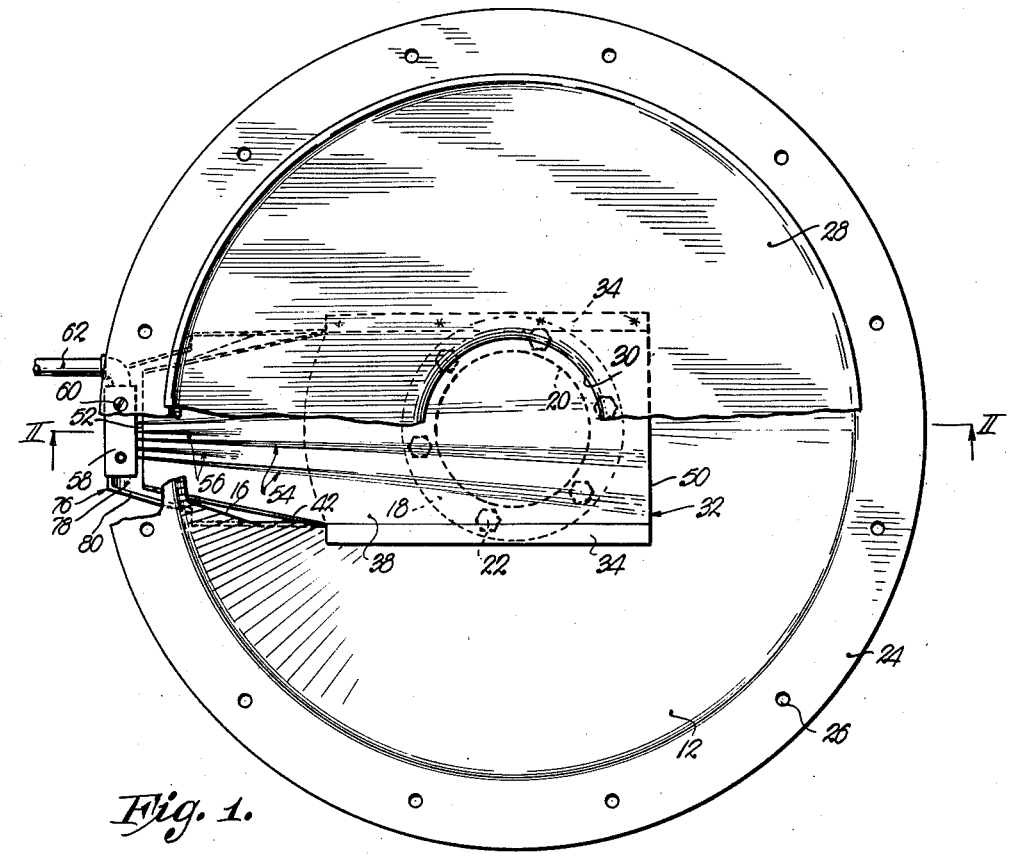
Fig. 1.
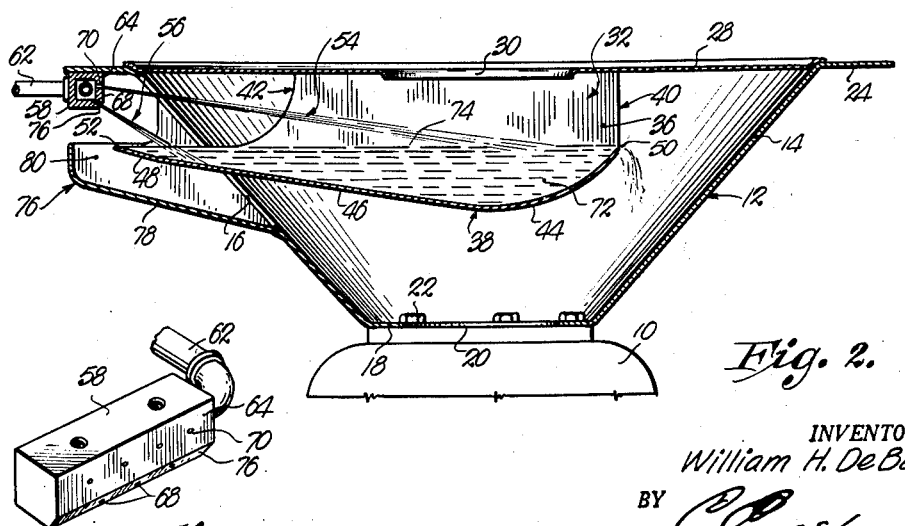
Fig. 2.
Fig. 3.
INVENTOR.
William H. DeBaun
BY
ATTORNEY.

United States Patent Office 2,786,001

Patented Mar. 19, 1957

2,786,001

GARBAGE AND TABLEWARE SEPARATING EQUIPMENT AND METHOD USING MOTIVATING WATER JETS

William H. De Baun, Kansas City, Mo., assignor to The Salvajor Company, Kansas City, Mo., a corporation of Missouri Application October 19, 1953, Serial No. 386,838

17 Claims. (Cl. 134—34)

This invention relates to kitchen appliances and particularly to a method and equipment adapted for use in separating tableware from garbage. The primary object of the invention is to provide a method of and apparatus for receiving and directing food scraps to a garbage grinder and simultaneously salvaging tableware accidentally dropped into the apparatus with the scraps.

In recent years particularly, there has been made available on the open market a rather large number of differing types of garbage grinders or the like adapted for use in the disposing of food scraps by grinding and directing the same into the sewage system. Difficulties have been experienced with accidental dropping of tableware into the grinding means along with the food scraps resulting in the loss of the tableware, which, in hotels or public eating places, results in very heavy expense.

It is, therefore, the most important object of the present invention to provide structure including a sump for forming a pool of liquid and disposed to receive not only the garbage, but the tableware, to the end that the latter will be collected in the sump for subsequent recovery.

Another important object of the present invention is to provide in structure of the aforementioned character, means to carry away the garbage received in the sump and to remove such garbage from the pool of liquid collected in the sump, all without interfering with the tableware that settles to the bottom of the sump and which may thereby be recovered.

A further object of the present invention is to provide a liquid basin having an open top for receiving garbage and having a novel bottom wall that is downwardly depressed to provide the aforementioned sump and form a pond of water, there being included in combination with the basin, means for directing streams of water into the basin and particularly against the pond of water formed in the sump to carry away the garbage from the basin and over one end of the bottom wall.

A still further important object of the present invention is to provide structure wherein the streams of water may be utilized to carry away the garbage while permitting recovery of tableware, having a perforated manifold from which the streams of water emanate so arranged above and outwardly from the basin so that excess garbage collected therein will not interfere with the operation of the manifold and thereby present an unsanitary condition incapable of passing health authority inspection.

It is another important object of the present invention to provide a garbage-receiving and tableware-salvaging machine wherein the aforementioned basin is open at both ends thereof and the bottom wall is downwardly depressed presenting a pair of opposed overflow edges, the manifold spray means being above and outwardly of one of the edges completely free and clear of the flow of garbage from the basin.

Another object hereof is to provide a machine as just above mentioned wherein the water basin is disposed within a hopper and one of the overflow edges thereof is disposed exteriorly of the hopper, there being included a chute on the hopper for receiving the overflow from the outermost basin edge and redirecting the same back into the hopper.

Other important objects will be made clear as the following specification progresses, reference being had to the accompanying drawing, wherein:

Figure 1 is a top plan view of garbage and tableware separating equipment having water jet motivating means made pursuant to the present invention, parts being broken away to reveal details of construction.

Fig. 2 is a substantially central, vertical, cross-sectional view taken on line II—II of Fig. 1; and Fig. 3 is a perspective view of the water manifold means entirely removed from its association with the remaining parts of the equipment.

While the equipment forming the subject matter of this invention is well adapted for many uses wherein garbage is to be destroyed and tableware salvaged, it is illustrated in the drawings, particularly in Fig. 2, in connection with a garbage grinder broadly designated by the numeral 10 of the type having a garbage-receiving inlet at the top thereof and not herein shown.

Such equipment includes a hollow hopper broadly designated by the numeral 12, having a frusto-conical side wall 14 provided with an opening 16 adjacent its uppermost end. The lowermost apex end of the hopper 12 has a wall 18 provided with an outlet 20 that registers with the inlet of the garbage grinder 10 when the hopper 12 is rigidly secured to the grinder 10 through suitable fastening means 22. An annular, outturned flange 24 on the side wall 14 at its uppermost end is provided with a plurality of openings or perforations 26, adapting the unit for installation in a sink, basin or the like, depending upon the use to which the equipment is to be placed. The uppermost open end of the hopper 12 is provided with a covering lid 28 that is in turn provided with a garbage-receiving hole 30 that is preferably at the center of lid 28.

A liquid basin broadly designated by the numeral 32, depends from the lid 28 within the hopper 12 and is secured directly to the bottom face of the lid 28 through employment of a pair of spaced, parallel, outturned flanges 34. The basin 32 is open at its top and at both ends thereof, there being a pair of spaced, upstanding side walls forming a part of the basin 32, one only of which is illustrated in Fig. 2 of the drawing and designated by the numeral 36. The side walls 36 have the flanges 34 integral therewith at their uppermost edges and are joined at the lowermost edges thereof by a downwardly depressed bottom wall 38. The side walls 36 are provided with straight vertical edges 40 at one end thereof and with arcuate edges 42 at their opposite ends which extend downwardly from the lid 28, thence outwardly in a substantially horizontal plane, through the opening 16 of frusto-conical side wall 14, terminating exteriorly of the hopper 12 as is clear in Figs. 1 and 2.

The bottom wall 38 is provided with a portion 44 adjacent the edges 40, which extends downwardly and inwardly from the lowermost ends of the edges 40 toward the vertical axis of the hopper 12 in a slight arc, the uppermost face of the portion 44 of bottom wall 38 being therefore, concave.

Another portion 46 of the bottom wall 38 is substantially flat, but slopes upwardly and outwardly from the said axis of the hopper 12 and, therefore, from the arcuate portion 44, toward the outermost ends of the edges 42, through the opening 16. Still another portion of the bottom wall 38 includes an upturned lip 48 at the outermost end of the flat bottom portion 46. Manifestly, the lowermost edges of the side walls 36 conform with the bottom wall 38 to which they are integrally joined.

It is seen, therefore, that the basin 32 is open at its top and disposed in direct underlying relationship to the hole 30 where the same will receive garbage and/or tableware accidentally dropped through the hole 30 with the garbage. One open end of the basin 38 is defined by the two edges 40 of side walls 36, the lid 28 and a substantially horizontal overflow edge 50 forming one end of the bottom wall 38 and extending between the side walls 36 at the lowermost ends of the edges 40. The opposite end of the bottom wall 38 terminates in a slightly narrower, but substantially horizontal, overflow edge 52, which, in the form chosen for illustration, is substantially in the same horizontal plane as the edge 50. Thus, the opposite open end of the basin 32 is defined by the lid 28, the two edges 42 of side walls 36 and the overflow edge 52 of bottom wall 38, or more specifically, the sloping portion 48 thereof.

One of the principal features of the present invention lies in the provision of means for causing the garbage to overflow the edge 50 of basin 32, and such means includes structure for directing a number of uppermost streams of water 54 and a plurality of lowermost streams of water 56 into the basin 32.

A hollow manifold 58 is suitably mounted exteriorly of the hopper 12 and appropriately on the flange 24 therebeneath through the medium of fasteners 60. The hollow manifold 58 is adapted to receive water or other liquid under pressure by means of a conduit 62 coupled with a source of such liquid not shown. Manifold 58 is provided with a vertical surface 64 that faces inwardly toward the side wall 14 in alignment with the opening 16 thereof and an inclined edge 66 that faces downwardly and inwardly toward the bottom wall 38. More specifically, the inclined edge 66 is disposed to direct the streams of water 56 emanating from ports 68 formed therein toward the portion 46 of bottom wall 38 adjacent the lip 48. A plurality of water outlet ports 70 through the surface 64 of manifold 58 are disposed to direct the streams of water 54 toward the edge 50 and approximately toward the arcuate portion 44 of bottom wall 38.

It is appreciated that the configuration of the bottom wall 38 is such as to present a sump which forms a pool 72 of the liquid emanating from the manifold 58, which assumes a level 74 in the plane of overflow edges 50 and 52. Accordingly, the streams of water 54 and 56 actually strike the pool of liquid 72 on the level 74 thereof at spaced-apart points, one adjacent but inwardly of the overflow edge 50 and one adjacent but inwardly of the overflow edge 52.

In normal operation of the equipment, the streams of water 54 and 56 are created by opening a suitable valve not shown, in the supply line 62 at the time of placing garbage in the basin 32 by way of hole 30. Such garbage scraped from plates, dishes and the like will fall into the sump, i. e., the pool 72 and by virtue of the inclination of bottom portion 46, such garbage, as well as the water, will tend to flow or surge toward the overflow edge 50. This tendency is enhanced by the force of the streams of water 54 and 56 and it is seen that the streams 56 tend to wash the garbage out of the pool of liquid 72, downwardly and inwardly along the inclined portion 46 toward the vertical axis of hopper 12. This action is such that any tableware that is accidentally dropped through the hole 30 into the pool 72 of basin 32, will be collected within the sump for subsequent recovery and the streams of water 56 will tend to wash the garbage out of the pool 72 from around the tableware. Such tableware being relatively heavy, will settle to the bottom of the basin 32 and not be carried therefrom by the action of streams of water 54 and 56.

All garbage that is relatively light and tends to float on the level of liquid 74, will immediately be washed from the basin 32, over the overflow edge 50 by the streams 54, and the force of the latter will also carry away the garbage that is swept upwardly and outwardly along the arcuate portion 44 toward the level 74 by the action of the streams 56. It is noted that these streams of water 54 travel through the opening 16 and through the proximal open end of basin 32 before striking the level of liquid 74. The streams 56 on the other hand are intended to impinge upon the level of liquid 74 exteriorly of the hopper 12 as shown in Fig. 2.

In the event that garbage is deposited in the basin 32 at a rate faster than the same is carried away over the overflow edge 50 and into the hopper 12, whereby the same tend to overflow the edges 42 and 52, such overflow is collected by a receiver or chute broadly designated by the numeral 76. Open top chute 76 directly underlies that part of the basin 32 which extends exteriorly of the hopper 12 and registers directly with the opening 16 of the side wall 14.

Chute 76 is provided with an inclined bottom wall 78 that slopes inwardly and downwardly toward the wall 14 where it joins with the side wall 14 at the lowermost end of the opening 16. Opening 16 is embraced by side walls 80 of the chute 76 which are likewise joined not only to the bottom wall 78, but to the side wall 14 of hopper 12. It is seen that all overflow passing over the edge 52 of lip 48 and edges 42, is collected by the chute 76 and redirected to the hopper 12, through the opening 16 below the bottom wall 38.

It is important to note that the manifold 58 is disposed in spaced relationship to the chute 76 thereabove and is spaced outwardly from the side wall 12, as well as outwardly and above the overflow edge 52, all to the end that any garbage overflowing the edges 42 and 52, will freely gravitate to the chute 76 without interference in any way whatsoever with the manifold 58. This feature is extremely important because otherwise, the entire unit would not be acceptable to public health authorities. Since the source of liquid for the manifold 58 will normally be the city water supply, there can be no risk of the garbage backing-up into the manifold 58 through the ports 68 and 70, and therefore, with manifold so disposed, all danger of contamination of the water supply is eliminated.

Inasmuch as the primary overflow for the garbage is intended to be that open end of the basin 38 adjacent the overflow 50, the width of the bottom wall 38 may progressively decrease as the overflow edge 52 is approached in the manner clearly illustrated by Fig. 1 of the drawing. Furthermore, by such construction, the dimensions of the garbage-receiving chute 76 may be reduced and still be so properly disposed as to contain or embrace that end of the basin 38 which projects outwardly beyond the hopper 12 through the opening 16.

Disposition of the manifold 58 entirely outside of the hopper 12 well above the level 74 of liquid, and therefore, above the garbage that floats and moves therealong, eliminates all interference with the intended free flow of the streams 54 and 56 and presents a unit that is entirely acceptable not only from the standpoint of sanitation, but for normal commercial and home applications.

Having thus described the invention what is claimed as new and desired to be secured by Letters Patent is:

1. In a garbage-receiving and tableware salvaging machine, an open top basin having a pair of opposed open ends and a downwardly depressed bottom, presenting a liquid-receiving sump adapted to form a pool; and means for directing a first liquid stream through one of said open ends, into the basin, against the level of liquid forming said pool adjacent said one open end, and toward the other of said open ends, and directing a second liquid stream through said one open end, into the basin, against said level of liquid adjacent said other open end, and toward the latter, whereby tableware received by the basin may be recovered from the sump and garbage received by the basin is washed out of the liquid forming the pool and from said level of liquid, through said other open end.

2. In a garbage-receiving and tableware salvaging machine, a hopper having an opening; an open top basin mounted in the hopper and extending through said opening, said basin having a pair of opposed open ends and a downwardly depressed bottom, presenting a liquid-receiving sump adapted to form a pool; means for directing a liquid stream through one of said open ends, into the basin, against the liquid forming said pool, and toward the other of said open ends, whereby tableware received by the basin may be recovered from the sump and garbage received by the basin is washed from the basin, through said other open end and into the hopper; and an open top chute beneath the bottom wall at said one open end and registering with said opening for receiving overflow emanating from the basin and passing through said one open end and redirecting the same through said opening into the hopper.

3. In combination with an open top, garbage-receiving hopper having a lowermost apex end provided with an outlet, and a frusto-conical side wall provided with an opening adjacent the open top thereof; a lid covering said open top of the hopper, said lid having a garbage-receiving hole; a basin secured to the lid, depending from the lid beneath the hole and extending through the opening, said basin having a pair of opposed open ends and a downwardly depressed bottom wall terminating in a pair of opposed overflow edges, one of the edges being spaced below the lid, the other edge being disposed exteriorly of the hopper; and means spaced above said other edge and spaced outwardly from said side wall of the hopper for directing a stream of water into the basin through one of said open ends toward the other of said open ends for washing garbage from the basin over said one edge as tableware accidentally dropped through the hole settles to said bottom of the basin.

4. In a garbage-receiving and tableware salvaging machine, an open top basin having a pair of opposed open ends and a downwardly depressed bottom, presenting a liquid-receiving sump adapted to form a pool; means for directing a liquid stream through one of said open ends, into the basin, against the liquid forming said pool, and toward the other of said open ends, whereby tableware received by the basin may be recovered from the sump and garbage received by the basin is washed from the basin, through said other open end; a hopper having a side wall provided with an opening; and an open top chute secured to the hopper exteriorly thereof beneath the basin for receiving overflow passing over the other of said edges, said chute sloping downwardly and inwardly toward said side wall of the hopper and registering with the opening beneath the basin for redirecting said overflow into the hopper.

5. In a garbage-receiving and tableware salvaging machine, an open top basin having a pair of opposed open ends and a downwardly depressed bottom, presenting a liquid-receiving sump adapted to form a pool; means for directing a liquid stream through one of said open ends, into the basin, against the liquid forming said pool, and toward the other of said open ends, whereby tableware received by the basin may be recovered from the sump and garbage received by the basin is washed from the basin, through said other open end; a hopper having a side wall provided with an opening; and an open top chute secured to the hopper exteriorly thereof beneath the basin for receiving overflow passing over the other of said edges, said chute sloping downwardly and inwardly toward said side wall of the hopper and registering with the opening beneath the basin for redirecting said overflow into the hopper, said means comprising a manifold adapted to receive water under pressure and provided with water outlet ports arranged to direct streams of water into the basin.

6. In a garbage-receiving and tableware salvaging machine, an open top basin having a pair of opposed open ends and a downwardly depressed bottom, presenting a liquid-receiving sump adapted to form a pool; means for directing a liquid stream through one of said open ends, into the basin, against the liquid forming said pool, and toward the other of said open ends, whereby tableware received by the basin may be recovered from the sump and garbage received by the basin is washed from the basin, through said other open end; a hopper having a side wall provided with an opening; and an open top chute secured to the hopper exteriorly thereof beneath the basin for receiving overflow passing over the other of said edges, said chute sloping downwardly and inwardly toward said side wall of the hopper and registering with the opening beneath the basin for redirecting said overflow into the hopper, said means comprising a manifold adapted to receive water under pressure and provided with water outlet ports arranged to direct streams of water into the basin, said manifold being spaced above the chute for permitting free flow of water and garbage into the chute.

7. In a garbage-receiving and tableware salvaging machine, an open top basin having a pair of opposed open ends and a downwardly depressed bottom, presenting a liquid-receiving sump adapted to form a pool; means for directing a liquid stream through one of said open ends, into the basin, against the liquid forming said pool, and toward the other of said open ends, whereby tableware received by the basin may be recovered from the sump and garbage received by the basin is washed from the basin, through said other open end; a hopper having a side wall provided with an opening; and an open top chute secured to the hopper exteriorly thereof beneath the basin for receiving overflow passing over the other of said edges, said chute sloping downwardly and inwardly toward said side wall of the hopper and registering with the opening beneath the basin for redirecting said overflow into the hopper, said bottom wall having a portion thereof sloping upwardly toward said one end whereby water and garbage tend to flow toward said other end under influence of said stream of water.

8. In a garbage-receiving and tableware salvaging machine, a basin presenting a liquid-receiving sump adapted to form a pool; means for directing a first liquid stream into the pool to present a subsurface current for flushing garbage away from tableware collected in the bottom of the basin and carrying such garbage toward one end of the basin; and means for directing a second liquid stream across and against the surface of the liquid forming said pool in impinging relationship thereto to present a surface current for washing the garbage from the basin at said one end thereof.

9. In a garbage-receiving and tableware salvaging machine, a basin presenting a liquid-receiving sump adapted to form a pool; means for directing a first liquid stream into the pool to present a subsurface current for flushing garbage away from tableware collected in the bottom of the basin and carrying such garbage toward one end of the basin, said bottom of the basin sloping downwardly in substantially the direction of flow of said first liquid stream and thence upwardly to said one end of the basin; and means for directing a second liquid stream across and against the surface of the liquid forming said pool in impinging relationship thereto to present a surface current for washing the garbage from the basin at said one end thereof.

10. In a garbage-receiving and tableware salvaging machine, a basin presenting a liquid-receiving sump adapted to form a pool; means for directing a first liquid stream into the pool to present a subsurface current for flushing garbage away from tableware collected in the bottom of the basin and carrying such garbage toward one end of the basin, said bottom of the basin having an arcuate portion extending downwardly and inwardly from said one end of the basin and a flat portion extending upwardly and outwardly from the first portion toward the opposite end of the basin in substantially the direction of flow of said first liquid stream and progressively decreasing in width as said opposite end of the basin is approached; and means for directing a second liquid stream across and against the surface of the liquid forming said pool in impinging relationship thereto to present a surface current for washing the garbage from the basin at said one end thereof.

11. In a garbage-receiving and tableware salvaging machine, a basin presenting a liquid-receiving sump adapted to form a pool; means for directing a first liquid stream into the pool to present a subsurface current for flushing garbage away from tableware collected in the bottom of the basin and carrying such garbage toward one end of the basin, said bottom having a first portion sloping downwardly and inwardly from the opposite end of the basin and a second portion extending downwardly and inwardly from said one end of the basin; and means for directing a second liquid stream into the pool toward said second portion of the bottom to wash the garbage from the basin at said one end thereof.

12. In a garbage-receiving and tableware salvaging machine, a basin presenting a liquid-receiving sump adapted to form a pool; and a hollow, liquid-receiving manifold at one end of the basin and provided with liquid outlet means disposed to direct a first liquid stream downwardly into the pool and toward the opposite end of the basin for flushing garbage away from tableware collected in the bottom of the basin and carrying such garbage toward said opposite end of the basin, said manifold having liquid outlet means disposed to direct a second liquid stream across and against the surface of the liquid forming said pool to wash the garbage from the basin at said opposite end of the latter.

13. In a garbage-receiving and tableware salvaging machine, a basin presenting a liquid-receiving sump adapted to form a pool; a lid overlying the basin and provided with an opening for receiving garbage to be discharged into the basin; and a hollow, liquid-receiving manifold at one end of the basin and provided with liquid outlet means disposed to direct a first liquid stream downwardly into the pool and toward the opposite end of the basin for flushing garbage away from tableware collected in the bottom of the basin and carrying such garbage toward said opposite end of the basin, said manifold having liquid outlet means disposed to direct a second liquid stream across and against the surface of the liquid forming said pool to wash the garbage from the basin at said opposite end of the latter, said manifold being disposed remote from the opening and therefore out of the path of travel of garbage discharged into the basin through the opening.

14. In combination with a garbage-receiving hopper having an opening; a basin having a downwardly depressed bottom wall terminating in a pair of opposed overflow edges; means mounting the basin within the hopper with one end thereof extending through said opening, disposing one of said edges exteriorly of the hopper; and means exteriorly of the hopper above the level of said one edge for directing a stream of water into the basin toward the opposite end thereof for washing garbage from the basin over the other of said edges as tableware accidentally dropped into the basin settles to said bottom thereof.

15. The method of pre-cleaning soiled dishes and simultaneously recovering tableware from table scraps which comprises the steps of discharging the ware and scraps into a pool of water whereby, through the action of gravity the ware settles to the bottom of the pool; and directing a stream of water under pressure in one direction along a straight line, said stream being at an angle to the level of said pool whereby to wash the scraps from the pool under the influence of currents of water in the pool created by the force of said stream, the angle of said stream being appreciably closer to the horizontal than to the vertical whereby the same impinges on said level tangentially thereof.

16. The method of pre-cleaning soiled dishes and simultaneously recovering tableware from table scraps which comprises the steps of discharging the ware and scraps into a pool of water whereby, through the action of gravity the ware settles to the bottom of the pool; and directing a stream of water under pressure in one direction at an angle along a straight line into the pool to the bottom of the latter, whereby to create an undercurrent in the pool for flushing the garbage from the tableware at the bottom of the pool and washing the scraps from the pool.

17. The method of pre-cleaning soiled dishes and simultaneously recovering tableware from table scraps which comprises the steps of discharging the ware and scraps into a pool of water whereby, through the action of gravity the ware settles to the bottom of the pool; directing a first stream of water in one direction into the pool to create an undercurrent in the pool for flushing the garbage from the tableware at the bottom of the pool; and directing a second stream of water in said one direction tangentially to the level of said pool to create a surface current for washing the scraps from the pool.

References Cited in the file of this patent

UNITED STATES PATENTS

| | | |
|---|---|---|
| 824,141 | Powers | June 26, 1906 |
| 1,900,255 | Ormsbee | Mar. 7, 1946 |
| 2,473,007 | Carson | June 14, 1949 |
| 2,485,968 | Hilliker | Oct. 25, 1949 |